United States Patent [19]

Sanfilippo et al.

[11] 4,336,174

[45] Jun. 22, 1982

[54] HARDBOARD TREATING COMPOSITION AND PROCESS FOR FORMING HARDBOARD SURFACES

[75] Inventors: Salvatore G. Sanfilippo; James T. White, both of Tuscaloosa, Ala.

[73] Assignee: Reichhold Chemicals, Incorporated, White Plains, N.Y.

[21] Appl. No.: 151,172

[22] Filed: May 19, 1980

[51] Int. Cl.$^3$ .............................................. C08L 61/28
[52] U.S. Cl. .................................... 524/512; 428/528
[58] Field of Search .............. 260/29.4 UA, 29.6 NR; 428/514, 528; 525/157

[56] References Cited

U.S. PATENT DOCUMENTS

| | | | |
|---|---|---|---|
| 2,120,137 | 6/1938 | Mason | 92/39 |
| 2,744,047 | 5/1956 | Ingrassia et al. | 154/132 |
| 2,766,162 | 10/1956 | Boehm et al. | 154/100 |
| 2,871,213 | 1/1959 | Graulich et al. | 525/157 |
| 2,924,548 | 2/1960 | Cotton | 162/132 |
| 2,988,462 | 6/1961 | Hunt | 117/143 |
| 3,056,718 | 10/1962 | Grissom et al. | 162/179 |

*Primary Examiner*—Theodore E. Pertilla

[57] ABSTRACT

An aqueous polymeric composition for use in treating surfaces of lignocellulose fiber laps during processing to produce lignocellulose hardboard sheets having improved physical characteristics.

5 Claims, No Drawings

HARDBOARD TREATING COMPOSITION AND PROCESS FOR FORMING HARDBOARD SURFACES

BACKGROUND OF THE INVENTION

The present invention relates to an aqueous polymeric composition for use in the manufacture of pressed lignocellulose hardboard sheets. The composition improves the surface characteristics of the hardboard sheets and provides for a quick release of stacked pressed hardboard sheets from interlineated platens during the pressure and heat curing of the sheet in the hydraulic press operation, thus producing a smooth finished pressed surface for each of the hardboard sheets. The finished surface of the hardboard sheets provides for improved paint holdout, a smooth hard surface, improved water resistance, board strength and fiber retention, as well as other desirable physical characteristics.

In the manufacture of hardboard, the sheets having two opposite smooth surfaces are produced from wet felted lignocellulosic fibers which are consolidated under pressure in a press to density of about 31 pounds per cubic foot or greater. The hardboard sheets are formed in their early stages of development from the hydrolyzed felted lignocellulosic fibers that have been felted into wet lap sheets. The wet lap sheets are stacked in a hydraulic press with a platen capable of being heated such as by steam between wet lap sheets. The wet lap sheets are dried to contain little residual moisture while being maintained under a consolidating pressure by maintaining the press under pressure and the platens heated to drive off the moisture.

After the consolidation operation is complete, the pressure on the sheets is released and the stacked consolidated sheets are in the form of finished hardboard sheets having opposite hard smooth surfaces.

One of the problems experienced after the pressing operation is the sticking of the hardboard sheets to the caul or platen of the press. Various approaches have been used to provide for a quick and positive release of the surface of the sheets from the platens, such as by applying to the surface of the lap sheet before consolidation various surface treatments such as water spray, talcum powder, water-soluble melamine copolymers, vinyl acetate copolymer emulsions and like treatments.

While such surface treatments have helped to mitigate the problem, the sticking of hardboard sheets to the caul or platen during manufacture still exists, with the result that considerable press downtime is experienced which, of course, decreases the rate of production with resulting increase in the cost of each finished hardboard sheet product. Other disadvantages experienced in the production of hardboard sheets that detract from high quality are fiber pickup, lack of good water repellency, and a high degree of water absorption, all of which must be improved if the production of high quality hardboard sheet at a reasonable cost is to be accomplished.

THE PRESENT INVENTION

This invention contemplates a pre-press hardboard treating composition and an improved hardboard sheet produced by the coating of the wet felt mats or laps or sheets, before consolidation and drying, with an aqueous sealer composition that consists essentially of (a) blend of water-soluble melamine formaldehyde copolymers, (b) a styrene acrylic copolymer emulsion, (c) a small amount of an amine capable of adjusting the pH of the resulting emulsion, and (d) a cross-linking acid catalyst capable of cross-linking the composition.

Hardboard sheets so formed, after consolidation and heat curing, have improved surface characteristics including the desirable quick release from the cauls and platens of a consolidating press.

It is the primary object of this invention, therefore, to provide a treating composition that provides for quick release of the surface of hardboard from platens and cauls during consolidation of the lignocellulose fiber after the heat curing of the composite and consolidating operation without fiber pickup.

It is another object of the invention to provide a treating composition which, when applied to the outer surface of the wet felt sheets before consolidation, produces after the consolidation of the hardboard a hardboard having the following improvements in physical properties:

1. Elimination of or minimizing of fiber raising on the surface of the board
2. Improved and more uniform surface hardness
3. Improved and more uniform density of the finished board
4. Improved and more uniform surface water repellency
5. Minimizing of water spotting
6. More uniform water absorption
7. Improved color of the finished hardboard
8. Improved stability and uniformity of finished coatings applied to the surface of the hardboard prior to use It has been known in the art for many years that desirable lignocellulose hardboard sheets can be formed having two smooth surfaces with outstanding physical properties. A method for preparing such a hardboard sheet is described in U.S. Pat. No. 2,120,137 to Mason. The specification of the Mason patent is incorporated by way of reference in this application. Generally in the production of the hardboard sheet of the present invention a blank is made from hydrolyzed lignocellulose fiber, and a wet lap sheet is formed containing from about 10% to about 15% moisture. The moisture is controlled so that an application of the novel aqueous treating composition will not penetrate too deeply by the advent of a wicking action. The treating composition is applied by spraying, doctoring, roller coating, or other like method of coating application. The lap sheets are coated at the rate of about 15 grams of composition per sq. foot with a typical treating composition having a solids content of from about 2.0 to about 7.0 grams/sq. ft. and preferably from about 4.0 to about 5.0 grams per sq. foot.

After coating, the wet lap sheets are passed through a drying oven to drive off water applied during the application of the aqueous treating composition.

The lap sheets are removed from the dryer operation and stacked one on top of the other in stacks as high as thirty to forty sheets. Each stack is allowed to reach a uniform moisture equilibrium of about 10 to about 15% moisture throughout the sheet. This reaching of moisture equilibrium is important because if too much moisture is in the sheet, the surface will blister; and if too little moisture is retained in the sheet the aqueous treating composition will not flow properly. In addition, if the moisture content of the sheets is too high the surface will not get good bonding and may cause uncured board problems with the warping of the sheets, thus giving a finished product having poor physical characteristics.

It has been found that sheets that are allowed to equalize from about 8 to about 32 hours, preferably from about 10 to about 16 hours, when coated with the aqueous treating compositions of this invention, produce excellent hardboard sheets with improved physical characteristics.

After the lap sheets have reached the desired moisture equalization, according to some practices in the art, two or more lap sheets are coated on surfaces to be joined together with an adhesive such as phenol-formaldehyde resin glue. However, U.S. Pat. No. 2,924,548 to Cotton discloses a process for making laminated hardboard products without an adhesive between laps which is also contemplated by this invention. The specification of the Cotton patent is incorporated by way of reference in this application.

The composite sheet formed from joined adhesively secured lap sheets is placed between platens or cauls where the composite sheet is heated under pressure to consolidate the fiber and form a surface with the aqueous coating on the lap sheets cured. The pressure of the heated platens or cauls forms a smooth finished surface. It has been found that internal temperatures within the range of about 315° to about 330° F. produce an excellent hardboard sheet having improved surface characteristics and quick release from the cauls or platens when the hardboard sheet has obtained its final cure.

The consolidation of the laminated lap sheets is accomplished in a press having a press cycle range from about 15 minutes to 25 minutes after internal temperature of the laminated lap sheets has reached between about 315° to about 330° F. Excellent results have been obtained when the press cycle-range is from about 15 to about 20 minutes after the desired internal temperature has been reached.

Pressure is applied after the desired internal temperature has been reached, and the pressure is applied all at once and held for the heat cure cycle. During this cure cycle, the pressure ranges from about 1500 to about 2500 psig, although a preferred range is from about 1950 to about 2100 psig.

After the cure cycle has been completed, the heating medium, which may be in the form of steam, is removed from the cauls or platens, and room temperature water is circulated. The pressed hardboard sheets remain in the press under initial pressure until the internal temperature of the sheets has cooled to about 150° to about 190° F. At this point in the process, the pressure is removed and the finished hardboard sheet is removed, examined, stacked and then trimmed ready for use. The finished hardboard sheet so produced has a fine, smooth surface which requires no buffing or polishing.

As disclosed previously, hardboard sheets are manufactured from interfelted lignocellulosic fibers which are consolidated under pressure in a hot press to a density of about 31 pounds per cubic foot or greater. The hardboard sheet can be formed by stacking a plurality of lignocellulose fiber mats between cauls or platens having a coating of an adhesive between adjacent surfaces of the mats forming the sheet so that, when heat and pressure are applied, there is formed a unitary hardboard sheet of the compacted mats that have been cemented together, for example, as described in the patent to Boehm et al, U.S. Pat. No. 2,766,162.

The patent to Ingrassia et al, U.S. Pat. No. 2,744,947, employs an aqueous resin coating on lignocellulose mats that is cured to an insoluble state in the formation of a hardboard sheet; and the patents to Hunt, U.S. Pat. No. 2,988,462 and to Grissom et al, U.S. Pat. No. 3,056,718 each uses a drying oil application to the surface of wet mats before consolidation in the formation of the hardboard sheet.

When the hardboard sheets are produced in accordance with the process of our invention, there is employed a prepress outer surface coating of an aqueous resinous composition containing melamine formaldehyde-type copolymers and a styrene acrylic copolymer to the top and bottom outer surface of the mats forming the stack. The coating is applied in a conventional manner such as by roller coating, doctor blade coating, offset coating, spray coating, and the like. It will be appreciated that the amount of coating will depend on the desired physical properties of the finished sheet.

The hardboard sheet thus coated exhibits when cured under heat and pressure improved physical properties such as increased stiffness and hardness, excellent finishing properties, greater resistance to abrasion and moisture as well as increased strength and durability, thus greatly enhancing the utility of the hardboard sheet. The hardboard sheet is also more uniform and exhibits the important property of quick release from platens and cauls employed during the pressure consolidation operation over hardboard sheets that are produced without a surface treatment of the melamine-formaldehyde/styrene acrylic copolymer composition of this invention.

The improvement in the release properties of the sheets from the platens and cauls results in fewer rejects because the incidence of the sticking of a sheet to the platens or cauls is substantially reduced. In addition, the composition produces a hard plastic coated surface which provides for greater acceptance of machining as well as improved resistance to marring and solvents. The hardboard sheet so produced also has the advantageous property of cleanability which greatly enhances its utility and use.

The improved density of hardboard sheets treated with the composition of the subject invention is produced by the permeation of the composition into the surface of the lignocellulosic fiber mats before compaction, thus aiding the fiber compaction process during the pressing and heating operation, with the resulting improvement in density throughout the thickness of the hardboard sheet produced after final compaction and curing.

Finished hardboard sheets that have been treated with the composition of this invention exhibit increased water resistance due to cementing or gluing of the compacted fibers together thus increasing the resistance to raising of the fibers on the surface of the hardboard sheet. This cementing or gluing of the fibers, particularly at the surface of the hardboard sheet, provides excellent paint holdout and ink holdout properties when the surface is subjected to a painting or printing application.

The storage-stable surface treating composition of this invention is an aqueous solution of a three-component homogeneous resin system that comprises a blend of from about 40 to about 60 parts by weight of a melamine-formaldehyde copolymer, from about 15 to about 30 parts by weight of a styrene-acrylic copolymer emulsion and from about 18 to about 30 parts by weight of a methylated melamine-formaldehyde copolymer, with the addition of from 25 to about 32 parts by weight of a compound capable of adjusting the pH to 7.7 or above, and from about 3 to about 7 parts by weight of a cross-linking catalyst. These components may be mixed together for a period of about 30 minutes under ambient temperature. It will be appreciated that other ingredients may be added to the solution such as extenders, wetting agents, humectants, solvents and thickeners, and the like.

The resulting aqueous polymer coating can be formed so that a proper coating application consistency is produced by adjusting the specific gravity and viscosity of the composition. If the viscosity is low, a thickener such as a 1% solution of Guar Gum in water may be added to the solution to bring the viscosity within the desired range, or if the viscosity is too high, additional water can be added. Also, if the pH is below 7.7, additional pH adjusting compound can be added.

The compounds for adjusting the pH can be any compound compatible with the aqueous resinous composition such as the amines, i.e. dimethylethanolamine, triethylamine, triethanolamine and the like, and other compounds such as ammonium hydroxide and the like.

The acid catalyst can be any compound that is compatible with the aqueous resinous system that will produce during the heating operation a cross-linking of the resins in the system. Typical of such acid catalysts are any of the acids or metallic salts that are well-known catalysts for cross-linking water-soluble melamines, such as p-toluene sulfonic acid, oxalic acid, phosphoric acid, sodium nitrate, and the like.

The invention is more particularly described and understood by the following examples which are exemplary of the process and composition of the invention.

EXAMPLE 1

An aqueous resin composition was prepared using the following method of preparation and order of inclusion of ingredients. In a clean vessel maintained at a temperature of from 25° to 30° C., 576.7 grams of a 31% non-volatile melamine-formaldehyde copolymer resin was charged and agitated. To this charge, while under agitation, was added 164.7 grams of a styrene acrylic emulsion followed by the addition of 164.7 grams of a 55% non-volatile methylated melamine-formaldehyde copolymer.

While still under agitation, water was added to the agitated mixture followed by the addition of 1.6 grams of p-toluene sulfonic acid, and then 9.9 grams of triethylamine. Additional water was added to bring the aqueous resinous solution to the desired viscosity for application of the composition to the outer surfaces of a stack of lignocellulosic fiber mat before compaction.

The above composition was sprayed on the outer surface of a stack of interfelted lignocellulosic fiber mats that had an adhesive coating between adjacent mats to form a unitary sheet. To the outer surfaces of the stack was applied a wet coating of 15 grams/sq.ft. which resulted in a deposit of 4.5 grams/sq.ft. of solids.

The mats were then placed in a hydraulic press between upper and lower cauls that had a heat transfer material circulating therethrough, and the stack of mats was maintained under pressure of 2000 psig for a period of 18 minutes at an internal temperature in the stack of 320° F. After the 18 minutes of pressure and heat treatment, the compacted mats were cooled to about 180° F. and then removed from the press as a hardboard sheet product.

The resultant hardboard sheet released from the press was tested with the following results obtained:
1. The hardboard sheet exhibited a quick release from between the cauls of the press
2. The density of the sheet was found to be above 31 pounds per cubic foot
3. The surface of the sheet exhibited a smooth hard finish when inspected and tested by hand
4. The surface of the sheet showed a high degree of resistance to water when tested for water resistance and repellancy
5. Paint tests made by applying paint to the surface of the hardboard sheet resulted in the sheet's exhibiting excellent paint holdout.

EXAMPLE 2

Using the process of Example 1, a series of prepress outer coatings based on water-soluble melamine-formaldehyde resins were formulated varying the amounts of acrylic copolymer emulsion as well as the water-soluble melamine resins as set forth in Table I. The amount of acrylic copolymer emulsion varies from 0.9% to 100% and the level of water-soluble melamine also varies from 0.9% to 50.0%. The evaluations of the prepared coatings were on lignocellulosic fiber mats. The coating was applied to the substrate by spray at a wet rate of 15 grams per square foot of 4.5 grams of solids per square foot. The mats were allowed to condition overnight and then pressed (2 boards) in a Wabash Press back to back with the complete curing cycle taking approximately 17 minutes with the temperature reaching 325° F. and 2000 psig. At the end of the curing cycle the sheets were removed from the press and evaluated for 24 hours water absorption, water spotting after 15 minutes, visual color uniformity and surface hardness.

TABLE I

| Melamine Formaldehyde Copolymer Formulations | | | | | | | | |
|---|---|---|---|---|---|---|---|---|
| Ingredients parts by weight based on weight of raw material | Control A | B | C | D | E | F | G | H |
| 27-761 SATINOL[1] | 100.0 | 50.0 | 50.0 | 50.0 | 50.0 | 70.0 | 58.1 | 58.1 |
| 96-811 DIARON[2] | | 50.0 | 49.5 | 24.7 | 24.7 | 19.5 | 33.2 | 16.5 |
| 40-358 SYN-THEMUL[3] | | | | 25.0 | | | | |
| 90-659 SYN-THEMUL[4] | | | | | 25.0 | | | 16.6 |
| Para Toluene Sulfonic Acid | | | .5 | .3 | .3 | .1 | .1 | .1 |
| Triethylamine | | | | | | .4 | .4 | .4 |
| Water | | | | | | 10.0 | 8.3 | .3 |

[1] Water-soluble melamine formaldehyde copolymer of Reichhold Chemicals, Inc., White Plains, N.Y.
[2] Water-soluble methylated melamine-formaldehyde copolymer of Reichhold Chemicals, Inc., White Plains, N.Y.
[3] Polyvinyl acetate emulsion of Reichhold Chemicals, Inc., White Plains, N.Y.
[4] Styrene/acrylic copolymer emulsion of Reichhold Chemicals, Inc. White Plains, N.Y.

The formulations A through H were prepress-coated on the outer surface of lignocellulose mats in the manner set forth in Example 1 and tests were made for color, water spotting, sticking to the cauls in the press, and 24-hour room temperature stability, with evaluation of results as follows in Table II.

TABLE II

Comparison of Physical Properties

| Physical Property | A | B | C | D | E | F | G | H |
|---|---|---|---|---|---|---|---|---|
| Color | 7 | 5 | 5 | 5 | 10 | 8 | 8 | 10 |
| Water spotting | 3 | 10 | 10 | 8 | 10 | 7 | 7 | 10 |
| Sticking | 6 | 6 | 10 | 10 | 10 | 10 | 10 | 10 |
| 24 hours room temp. stability | 10 | 10 | 0 | 0 | 0 | 10 | 10 | 10 |

0 Poorest
10 Excellent
7-8 would be in the acceptable range

From the results of the tests of prepress outer surface treatment of the mats, it is apparent that the run designated by the letter "H" shows superior results in physical properties over all of the test runs. Run "E", which had a much higher percentage of styrene acrylic copolymer emulsion than run "H", while exhibiting excellent coloring, resistance to water spotting, and resistance to sticking to the cauls of the press, lacked 24-hr. room temperature stability.

Runs "F" and "G" were found to be only in the acceptable range for coloring and resistance to water spotting, but were excellent in the quick release from the cauls of the press and 24-hour room temperature stability. However, runs "F" and "G" did not exhibit the improvement in overall physical properties that was exhibited when a styrene acrylic copolymer was included in the formulation of the composition.

Although the invention is described in detail for the purpose of illustration, it is to be understood that such detail is solely for that purpose and that variations can be made therein by those skilled in the art without departing from the spirit and scope of the invention except as it may be limited by the claims.

What is claimed is:

1. A storage-stable aqueous polymeric composition for application to the wet surfaces of lignocellulose fiber hardboard sheets before processing in a forming press that maintains the sheets under heat and pressure, said aqueous composition being (A) a homogeneous three-component system containing on a dry solids basis a miscible mixture of from about 40 to about 60 percent by weight of a water-soluble melamine-formaldehyde copolymer, from about 15 to about 30 percent by weight of a styrene-acrylic copolymer emulsion, and from about 18 to about 30 percent by weight of a water-soluble methylated melamine-formaldehyde copolymer; (B) from about 25 to about 32 percent by weight of a compound capable of adjusting the pH of the composition; and (C) from about 3 to about 7 percent by weight of a cross-linking acid catalyst, based upon the total weight of the solids said composition having a dry resin solids range of from about 30 to about 40 parts by weight.

2. The composition of claim 1 wherein the acid catalyst in the aqueous polymeric composition is at least one member selected from the group consisting of p-toluene sulfonic acid, oxalic acid, phosphoric acid and sodium nitrate.

3. The composition of claim 1 in which the acid catalyst is p-toluene sulfonic acid.

4. The composition of claim 1 wherein the compound capable of adjusting the pH in the aqueous polymeric composition is at least one member selected from the group consisting of triethylamine, triethanolamine, dimethylethanolamine and ammonium hydroxide.

5. The composition of claim 4 in which the compound is triethanolamine.

* * * * *